Figure 1:
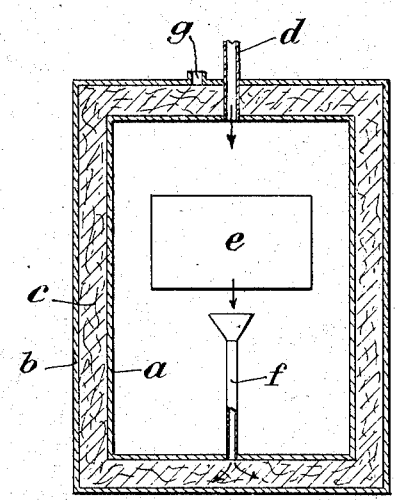

Patented Mar. 28, 1939

2,151,713

UNITED STATES PATENT OFFICE 2,151,713

ARRANGEMENT TO AVOID CONDENSATION WITHIN COLD INSULATIONS

Hans Niemann, Hanover, Germany

Application March 27, 1934, Serial No. 717,587
In Germany April 3, 1933

6 Claims. (Cl. 62—89)

Where an insulation is used against temperatures which lie below the prevailing temperature of the outside air, moisture condenses or is given up by the air located within the insulation. This formation of condensate takes place in the zone between the dew-point lying within the insulation and the cold limiting surface of the insulation and moistens the insulation. The moistening or moisture materially diminishes the effectiveness of the insulation. Also in this way organic insulations, in the course of time, are destroyed by rotting. With air-layer insulations the radiation coefficient of the surfaces bordering the individual air-layers is increased by the deposit of condensate, and thus the effectiveness of the insulation directly reduced. After a considerable time corrosion may take place with air-layer insulations.

When using organic insulation and in order to prevent the destruction of the insulation by the formation of condensate, the organic insulation, for instance, is impregnated with pitch or other bituminous materials. Within air-layer insulations one has provided the metallic dividing walls with protective coatings of oxide or lacquer which permit radiant heat to pass. By this method the destruction of the insulation, in the long run, is not avoided; on the other hand, the conserving steps result in a diminishing of the insulating efficiency.

To minimize the formation of condensate, for instance, it is known to arrange an airtight seal of the insulation. By airtight enclosure of the insulation, it is true, the elimination of condensate from the air circulating through the insulation is prevented; not, however, the elimination of moisture from the air contained within the airtight enclosure that is within the insulation. Besides, the airtight sealing of insulations is practically very difficult and totally impossible for larger objects or installations.

The invention avoids the disadvantages of the above described arrangement in the following manner:

The insulated box or room is provided with means for the circulation of cold air through the insulation, so that the air on the cold side enters the insulation and passes through it in the direction towards the warm side, or, in other words, opposite to the direction of the heat flow. Before entering the insulation, the air, directly or indirectly, is cooled and dried by the surfaces within the refrigerating room or space. The insulation itself is always warmer than the refrigerating space. Within the insulation, therefore, the admitted air is warmed and thus cannot give up moisture, but can only absorb moisture. So a possibly damp insulation is dried by the air movement caused by the arrangement of the invention. Out of the warm side the air passes directly into the atmosphere, or by a special conduit is again carried into the refrigerated space, in order to pass through the insulation in continuous sequence, after having first been cooled down.

The air circulating for keeping the insulation dry must, therefore, pass through an open or closed circuit. This circuit is essential for the invention. The movement of the air is the result of both the natural rise which the air receives by warming up within the insulation, and of the descent in the refrigerated space due to cooling off. The harnessing of these forces for the air movement is made possible by arranging the corresponding air openings in the walls of the insulation at different heights. The incoming openings are arranged lower than the outgoing ones. The positive and negative rising forces of the air suffice for an air movement which prevents moisture deposit in the insulation, which, on the other hand, is not sufficient to appreciably reduce the insulating efficiency by heat transmission attributable to convection. The arrangement of this invention has special value for air space insulations in refrigerators or refrigerating boxes, since the low resistance which the air space insulations offer to the movement, permits a particularly simple arrangement. An example of air space insulation is shown in Dyckerhoff Patent No. 1,934,174 where the insulation consists essentially of layers of metal foil spaced by their shape in such a way that air can move quite freely through the insulation.

Figure 2:
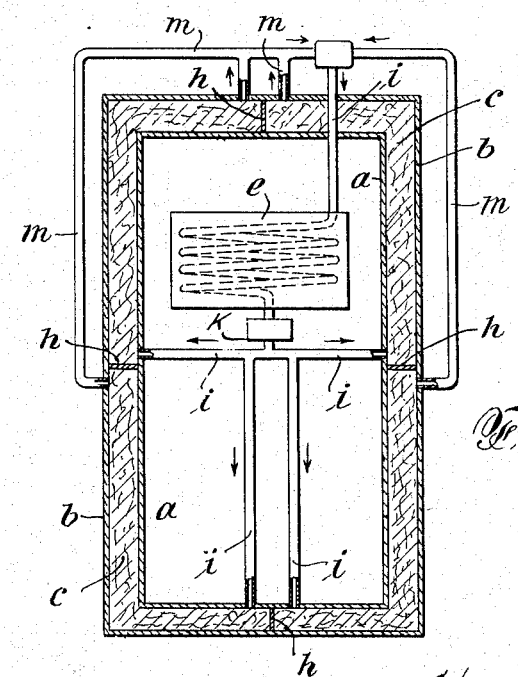

In the accompanying drawing, Fig. 1 is a sectional view of a refrigerator with the cooling unit indicated diagrammatically. Fig. 2 is a similar section of a refrigerating room.

Figure 1 shows an application of the invention for refrigerators or refrigerating boxes. In the drawing, $a$ is the inner cold side of the insulation, $b$ the outer warm side, and $c$ is the insulation. The atmospheric air enters through duct $d$ and is carried over the cooling apparatus $e$ into the insulation $c$ through pipe $f$. Through the opening $g$ the air warmed within the insulation $c$ passes again into the atmosphere.

Figure 2 shows an application of the invention for refrigerating rooms or the like. The insulation $c$ is divided into compartments by small strips $h$ of a more impervious material. The air flowing in the pipe line $i$ is cooled down by the cooling apparatus $e$. The moisture possibly depositing is collected in a moisture collector $k$. The pipe lines $i$ carry the cooled dry air to the insulation compartments from which the warmed air is returned to pipe line $i$ through vent or pipes $m$. A closed circuit for the air is provided.

What I claim is:

1. A method of the character described for treating insulation masses around refrigerated constructions, which comprises, conducting cold air from a refrigerated space into the insulation mass, causing the air to rise and circulate through the insulation mass by the natural draft or rising force of the air being warmed within the insulation mass, and then conducting the warmed air away from the interior of the insulation mass.

2. A refrigerator or the like provided with an insulated wall having insulation of the air space type, a pipe extending through said insulated wall and into the interior of the refrigerator and communicating with the interior of said insulated wall below the top of the refrigerator, said pipe being arranged adjacent the cooling apparatus in the refrigerator, another pipe outside the refrigerator and leading from the interior of said insulated wall at a higher level than said first pipe connection with said wall and communicating with said first mentioned pipe to form a closed circuit for the circulation of air through said insulated wall.

3. A refrigerator or the like provided with an insulated wall comprising insulating material having spaces which permit the movement of air, a pipe positioned within the interior of the refrigerator and communicating with the interior of said insulating material below the top of the refrigerator, another pipe extending from the exterior to the interior of the refrigerator adjacent the top thereof, and a tube leading from the top of the insulating material to the exterior of the refrigerator, whereby cool air is passed from the interior of the refrigerator through the insulating material of the insulated wall and becomes heated and then rises and leaves the insulated wall through said tube at the top of the refrigerator.

4. A refrigerator or the like provided with an insulated wall comprising insulating material having spaces which permit the movement of air, means located within the refrigerator for cooling and removing the moisture from the air that flows through said insulating material, a pipe positioned within the interior of the refrigerator to receive air cooled by said cooling means and to conduct the air to the said insulating material, a vent extending through the top of the insulated wall of the refrigerator and an inlet extending from the exterior to the interior of said refrigerator and adapted to conduct air from said vent through said cooling means to said pipe to form a closed system for the circulation of cooled and dehumidified air through the insulating material in the wall of the refrigerator.

5. A refrigerator or the like provided with an insulated wall comprising insulating material having spaces which permit the movement of air, means located within the refrigerator for cooling and removing the moisture from the air that flows through said insulating material, a plurality of pipes arranged within the interior of the refrigerator to receive air cooled by said cooling means and to conduct the air to said insulating material below the top of the refrigerator, a plurality of vents located in the top insulated wall of the refrigerator and adapted to conduct air out of said insulating material, an inlet extending from the exterior to the interior of said refrigerator and adapted to conduct air through said cooling means to said pipes, and a plurality of pipes exterior to said insulating material and connected to said inlet and to said vents for conducting back into said inlet the air that has passed through said insulating material and through said vents, whereby a plurality of paths are provided for circulation of the air through the insulating material.

6. A refrigerator or the like as defined in claim 5 and characterized further by the provision of substantially impervious partitions located in the insulating material and dividing the same into upper and lower sections, and in which said plurality of exterior pipes conduct the air from the insulating material of said upper and lower sections back to said inlet.

HANS NIEMANN.